3,383,176
CATALYTIC PROCESS FOR ORTHO-PARA HYDROGEN CONVERSION

Carl D. Keith, Summit, and Alfred J. Haley, Jr., Westfield, N.J., assignors to Engelhard Industries, Inc., Newark, N.J., a corporation of Delaware
No Drawing. Filed May 12, 1964, Ser. No. 366,894
7 Claims. (Cl. 23—210)

ABSTRACT OF THE DISCLOSURE

A catalytic process for equilibrating the ortho-para content of hydrogen by contacting hydrogen at low temperature with a ruthnium-containing catalyst.

---

This invention relates to the interconversion of ortho-para hydrogen and, more particularly, to a novel method for producing hydrogen enriched in orth- or para-hydrogen.

The existence of two forms of molecular hydrogen, designated as ortho and para hydrogen is well known. In the hydrogen molecule, the nuclear spins of the two hydrogen atoms can be either in the same direction (ortho) or in oppose directions (para). The proportion of each form of hydrogen present in any given sample of hydrogen at equilibrium is a function of temperature. At temperatures above about $-100°$ F., "normal" hydrogen exists, that is, hydrogen having an equilibrium composition of 75% ortho hydrogen and 25% para hydrogen. As the temperature is lowered, the equilibrium composition shifts in the direction of higher para content, i.e. the concentration of para hydrogen increases with decreasing temperature. As the temperature decreases from $-73°$ C. to about $-173°$ C., the para hydrogen concentration increases gradually from 25% to about 38%; at $-195°$ C., the composition is about 50% ortho-50% para; while at the boiling point of hydrogen at atmospheric pressure, hydrogen exists as substantially 100% para.

Ortho and para hydrogen, while chemically identical, exhibit different physical properties, e.g., each of these forms of hydrogen have different heat capacities and thermal conductivities. Further, the transformation of ortho to para hydrogen to approach the equilibrium proportions of each as the temperature of a hydrogen sample is decreased is exothermic, i.e. accompanied by liberation of heat. Conversely, the conversion of the para to the ortho form is endothermic.

The liberation or absorption of heat which is characteristic of the interconversion of these forms of hydrogen can be an advantage or disadvantage, depending upon the particular use or process involved in the use of hydrogen. For example, liquified normal hydrogen undergoes autogenous conversion of ortho to para hydrogen, liberating 339 calories per mole upon conversion of normal hydrogen to 100% para hydrogen at about $-252°$ C. Since the heat of ortho hydrogen conversion is greater than the heat of vaporization of hydrogen at atmospheric pressure, liquid hydrogen will vaporize until 100% para hydrogen composition is reached. Thus, before storage of liquid hydrogen, conversion of normal hydrogen to the low temperature equilibrium composition of hydrogen (high para) is beneficial, and indeed necessary in hydrogen liquification processes.

Similarly, in certain applications, absorption of heat which occurs in the conversion of para to ortho hydrogen can in certain applications be utilized to provide low temperature refrigeration.

The rate of autogenous transformation of one form of hydrogen to the other is extremely slow, even at room temperature, but it has been found that conversion can be accelerated in either direction by catalysis.

This invention is concerned with catalysts which are effective for promoting ortho-para hydrogen interconversion. It has been found that metallic ruthenium and certain ruthenium alloys are particularly effective catalysts for the ortho-para hydrogen interconversion.

The ruthenium catalysts used in the practice of this invetnion consist of elementary ruthenium and ruthenium alloys with certain other metals including rhodium, cobalt, rhenuim, tantalum, and osmium.

In general, it is essential that the ruthenium catalyst be in finely divided form. When ruthenium metal or alloys thereof are employed as catalysts, powders in the form of particles of about 4 to about 1000 microns (surface area 2 to 200 m.$^2$/g.) are used. Preferably, the ruthenium catalyst is extended upon an inert support, e.g. charcoal, alumina, kieselguhr, thoria, diatomaceous earth, silica gel and the like. Carbon and alumina are particularly useful as supports. The supported catalysts can contain from about 5% up to about 60% by weight ruthenium or more, but catalysts containing up to about 25% ruthenium are preferred since they are less expensive. The support is preferably finely divided, e.g. in the form of particles of .001 to 100 microns, having surface areas of about 2–1500 square meters per gram.

Alloys of ruthenium with metals selected from the group consisting of rhodium, cobalt, rhenium, tantalum and osmium have been found to be particularly effective as catalysts for the ortho-para hydrogen interconversion. Such alloys can contain from about 2 to about 90% of the alloying metal, the remainder being ruthenium. Surprisingly, it has been found that certain alloys of ruthenium with other platinum group metals, e.g. ruthenium-platinum alloys, are catalytically inactive for the purpose.

A wide variety of ruthenium-containing catalysts have been evaluated for their ability to promote the ortho-para hydrogen interconversion, and it has been found that there is no apparent correlation between the activity of the catalyst and the surface area of the catalyst, including support as measured by the B.E.T. method. However, it has been found that the available ruthenium area of the supported catalyst has an effect on the efficiency of the catalyst for promoting ortho-para interconversion, and for suitable activity, the available ruthenium area should be greater than about 1 square meter per gram of catalyst as determined by CO chemisorption. Preferably, the ruthenium area should be greater than 15 m.$^2$/gm. catalyst and can range as high as 100 m.$^2$/gm. or even higher.

The ruthenium surface area of any particular catalyst is directly related to the crystallite size of the ruthenium, and it has been found that improved activity is obtained with supported catalysts having a metal crystallite size of less than 100 A. as determined by X-ray diffraction or CO chemisorption. In carbon supported catalysts having less than about 25 weight percent ruthenium the crystallite size is preferably below about 50 A. While it is evident that catalysts having small ruthenium crystallite size would have greater metal surface area available, the required crystallite size to make such surface area available will vary with the support, if any, and the concentration of metal on the support. For example, the available catalyst metal deposited on a support having a lower micro to macropore ratio would probably be greater than if such catalyst were deposited on a support having a higher ratio.

The present invention is not limited to any specific method of preparation of the ruthenium or ruthenium alloy catalyst. Such catalysts and methods for their preparation are known, and generally involve the coating or impregnation of the catalyst support with a solution of a ruthenium metal salt, followed by drying and heating the impregnated material to decomposition temperature in a stream of reducing gas, e.g. hydrogen. The crystallite size of the ruthenium can be controlled, inter alia, by proper selection of the temperature at which reduction is effected. Further, treatment of supported metal to optimize catalytic activity can be effected by heating in a reducing atmosphere. In such pretreatment, use of temperatures above the sintering temperatures of the metal or alloy employed as catalyst should be avoided, especially since the metal is in its most active catalytic form when finely divided. It has been found, e.g. that the activity of a ruthenium catalyst supported on alumina (6 wt. percent Ru) can be improved by heating in hydrogen for several hours at temperatures as high as 600° C. In general, such pretreatment where employed, should be effected for ½ hour or more in hydrogen at temperatures between about 75° C. and 600° C.

In the practice of the present invention, hydrogen in gaseous form having an ortho-para hydrogen content different from the equilibrium concentration thereof at a particular temperature is contacted with the catalyst at such temperature, and hydrogen effluent is withdrawn having an ortho-para hydrogen distribution more closely approaching the equilibrium distribution at such temperature. The contacting with the catalyst can be effected at any temperature, generally between about room temperature and −250° C. Pressure is not critical, and can range from below atmospheric to atmospheric and even super atmospheric pressure, e.g. 100, 1,000 and even 5,000 p.s.i., depending upon the source of hydrogen and ultimate use thereof after equilibration at ambient temperature. Normal hydrogen can, for example, be cooled by conventional refrigeration techniques employing liquid nitrogen or other refrigerant to temperatures of about −200° C., and the cooled gas comprising 25% para and 75% ortho hydrogen continuously passed in contact with the catalyst bed. Provision should be made, in such case, and particularly in the commercial application of such process, for removal of the heat liberated in the conversion of the ortho to the para form. In general, the catalysts of the present invention can be employed at weight hourly space velocities (pounds of hydrogen per pound of catalyst per hour) of from 5 to about 500, to convert para or ortho hydrogen contained in the feed to about 75% of the equilibrium concentration.

The feed to the catalyst should be free of impurities which exert a deleterious effect on the catalyst, such as moisture, hydrogen sulfide, and the like. The feed may comprise substantially pure hydrogen when effecting conversion at subambient temperatures, or admixture of hydrogen with inert gas, e.g. nitrogen and/or the inert gases He, Ne, A, etc. when effecting conversion at comparatively high temperatures. Where substantially 100% hydrogen is required as feed, it is preferable to subject the feed to a preliminary purification step before contacting with the catalyst, e.g. by passing over activated alumina molecular sieves or other known adsorbents which remove impurities. A preferred method for preparing the hydrogen feed is to effect purification thereof by preliminary treatment in a hydrogen diffusion unit employing a palladium or palladium-alloy septum. Purifiers of this type are commercially available.

In the following description and examples, purified normal hydrogen was contacted with various catalysts at a temperature of −195° C. to convert ortho hydrogen to para hydrogen. It will be understood, however, that the catalytic method described herein can be equally effectively employed to convert para hydrogen to ortho hydrogen, but in such case it is necessary to first prepare hydrogen having higher para content than exists in the equilibrium mixture at any particular temperature. The conversion of ortho to para was employed for test purposes since normal hydrogen is more readily available.

In order to test the activity of various catalysts for ortho-para hydrogen conversion, a test system was constructed in which the hydrogen was initially purified by passing through a commercial hydrogen-palladium diffusion unit which delivered hydrogen at 175 p.s.i.g. with flow rates up to 150 s.l.p.h. (standard liters per hour). The effluent from the purifier was divided into two streams, one portion going directly to a thermal conductivity cell after pressure reduction to 20 p.s.i.g. The second portion was passed at 100 p.s.i.g. to a sample tube containing the test catalyst, the sample tube consisting of 0.125 inch O.D. by 16 inch long precooling coil wound in a 1-inch diameter through which the purified normal hydrogen was passed and cooled to liquid nitrogen temperature before contacting the sample catalyst. The precooling coil led to a 0.25 O.D. by 6 inch long straight tube containing the test catalyst, also maintained at liquid nitrogen temperature. The hydrogen stream, after leaving the sample and being suitably adjusted in pressure, was passed to the thermal conductivity cell, so that para-ortho compositions leaving the sample tube were continuously compared with purified normal hydrogen.

The thermal conductivity cell was wired into a Wheatstone bridge-type circuit and powered by a 12 volt storage battery, the signal from the cell being fed to a recording potentiometer. With normal hydrogen passing to both sides of the cell, the recorder was adjusted to zero. Then when converted hydrogen was passed through the cell the recorder pen deflects to form a plateau at a fixed distance from the zero line. The distance between the zero line and plateau formed by the converted hydrogen is equal to about 25% para hydrogen since normal hydrogen is 25% para and the converted hydrogen is 50% para. Mixtures of ortho-para hydrogen delivered to the conductivity cell from the test catalyst are assumed to be directly proportional to the calibration deflection.

The specific surface area of catalysts was determined by the B.E.T. method, using low temperature nitrogen adsorption. The surface area was calculated from three adsorption points, for each sample, using the method of least squares. Generally this method provides an accuracy of 1.5%.

The average crystallite size of catalysts was determined by conventional X-ray diffraction methods using a Phillips Norelco spectrometer.

In testing each catalyst, the data obtained were converted, based upon the weight of catalyst employed and the flow rate of hydrogen, to values for gram catalyst per gram hydrogen per second for conversion of normal hydrogen to 30%, 50% and 70%, respectively, of the equilibrium para concentration at −195° C. A catalyst is considered fair if this value for 70% conversion is less than 400; good if this value is less than 100; excellent if this value is less than 50.

The following examples are provided to illustrate and not to limit this invention:

Example 1

Finely divided catalysts of Group VIII nonprecious metals supported on alumina were compared in tests described above to determine their effectiveness for ortho-para conversion. Activated alumina and supported Ru and Cu were also tested. Results of such tests are shown in Table I.

TABLE I.—ORTHO-PARA HYDROGEN CONVERSION BY FINELY DIVIDED METALS SUPPORTED ON ALUMINA

| Test No. | Metal | Surface Area, m.²/g. (B.E.T.) | Gm. Catalyst/Gm. H₂/Second for conversion of— | | |
|---|---|---|---|---|---|
| | | | 30% | 50% | 70% |
| 1 | Ru (6%) | 121 | | | 50 |
| 2 | Fe (5%) | 261 | >2,000 | | |
| 3 | Ni (5%) | 195 | >2,000 | | |
| 4 | Ni (5%) | 315 | >2,000 | | |
| 5 | Co (5%) | 135 | >2,000 | | |
| 6 | Cu (5%) | | >2,000 | | |
| 7 | None (Pure Alumina) | 497 | >2,000 | | |

The data in Table I show that the ruthenium catalyst was very active and far superior to other catalysts tested for this reaction. It will be noted that the alumina support alone showed little or no activity. An examination of the crystallite size of the catalysts was made in Tests 3 and 5. The nickel and cobalt crystallites were not detected by X-ray diffraction indicating crystallite sizes well under 50 A.

Example 2

A number of finely divided precious metal catalysts supported on carbon were tested in the same way as Example 1 to determine their relative effectiveness for ortho-para conversion. Results of such tests are shown in Table II.

TABLE II.—ORTHO-PARA HYDROGEN CONVERSION BY FINELY DIVIDED PRECIOUS METALS SUPPORTED ON CARBON

| Test No. | Metal | Surface Area, m.²/g. (B.E.T.) | Gm. Catalyst/Gm. H₂/Second for conversion of— | | |
|---|---|---|---|---|---|
| | | | 30% | 50% | 70% |
| 8 | Ru (5%) | 1,230 | | 11 | 50 |
| 9 | Ru (5%) | 704 | 20 | 34 | 65 |
| 10 | Rh (5%) | 1,020 | 175 | 320 | 660 |
| 11 | Pd (5%) | 904 | >2,000 | | |
| 12 | Pt (5%) | | >2,000 | | |
| 13 | Rh (2.5%), Ru (2.5%) | 1,123 | | 64 | 86 |

Table II shows that Ru, Rh and Ru-Rh catalysts were superior to Pd and Pt catalysts. While Rh was superior to Pd and Pt it was not as effective as the Ru and Ru-Rh catalysts. It can be noted that the activity of the Ru catalysts having a surface area of 704 m.²/g. catalyst was greater than that for the Rh and Pd catalysts which had surface areas of 1020 m.²/g. and 904 m.²/g. respectively.

Example 3

A number of finely divided precious metal catalysts and combinations of precious metals with other precious and non-precious metals were prepared and tested. A summary of the results is given in Table III. None of the platinum alloys were acceptable. Ruthenium alloys with rhodium, tantalum, rhenium, cobalt and osmium showed greater activity than unsupported ruthenium. Of the ruthenium alloys, the 50–50 combination with rhodium showed the highest activity.

TABLE III.—ORTHO-PARA HYDROGEN CONVERSION FINELY DIVIDED ALLOYS

| Test No. | Metal | Surface Area, m.²/g. (B.E.T.) | Gm. Catalyst/Gm. H₂/Second for conversion of— | | |
|---|---|---|---|---|---|
| | | | 30% | 50% | 70% |
| 14 | Rh (90%), Ru (10%) | | 39 | 88 | 201 |
| 15 | Rh (75%), Ru (25%) | 37 | 50 | 70 | 126 |
| 16 | Rh (50%), Ru (50%) | 40 | | | 70 |
| 17 | Rh (25%), Ru (75%) | | | | 135 |
| 18 | Rh (2%), Ru (98%) | | 27 | 66 | 144 |
| 19 | Rh (67%), Ir (33%) | | 185 | 420 | |
| 20 | Rh (50%), Ir (50%) | | 190 | 410 | |
| 21 | Pt (90%), Co (10%) | | >2,000 | | |
| 22 | Pt (80%), Fe (20%) | | >2,000 | | |
| 23 | Pt (80%), Mo (20%) | | >2,000 | | |
| 24 | Pt (67.5%), Ru (32.5%) | 55 | >2,000 | | |
| 25 | Pt (67.5%), Ru (32.5%) | 24 | >2,000 | | |
| 26 | Pt (67.5%), Ru (32.5%) | | >2,000 | | |
| 27 | Pt (60%), Ru (40%) | 135 | >2,000 | | |
| 28 | Pt (54.7%), Ru (45.3%) | | >2,000 | | |
| 29 | Pt (53.3%), Ru (46.7%) | | >2,000 | | |
| 30 | Ru (90%), Co (10%) | | 95 | 200 | 360 |
| 31 | Ru, Re [1] | 11 | 37 | 68 | 150 |
| 32 | Ru (50%), Ta (50%) | | 110 | 223 | 400 |
| 33 | Ru (100%) | | 124 | 258 | 590 |
| 34 | Ir (100%) | 60 | >2,000 | | |
| 35 | Ir (100%) | 99 | >2,000 | | |
| 36 | Ru (90%), Os (10%) | | 45 | 101 | 209 |

[1] Concentrations not determined.

Example 4

Table IV shows a summary of results of a series of catalysts comprising Ru supported on alumina, thoria, silica-alumina, or carbon and having ruthenium contents ranging from 5% to 50% (on weight of metal basis).

TABLE IV.—ORTHO-PARA HYDROGEN CONVERSION BY SUPPORTED RU CATALYSTS

| Test No. | Composition | Surface Area, m.²/g. (B.E.T.) | Gm. Catalyst/ Gm. H₂/Second for conversion of— | | |
|---|---|---|---|---|---|
| | | | 30% | 50% | 70% |
| 37 | Ru(6%) on Al₂O₃ | 121 | | | 50 |
| 38 | Ru(5%) on Carbon | 704 | 20 | 34 | 65 |
| 39 | do | 1,230 | | 11 | 50 |
| 40 | Ru(25%) on Carbon | | 8 | 14 | 23 |
| 41 | Ru(50%) on Carbon | 371 | 10 | 19 | 41 |
| 42 | do | 389 | 15 | 25 | 40 |
| 43 | Ru(20%) on Thoria | 86 | 17 | 28 | 63 |
| 43A | Ru(10%) on Silica-Alumina | <10 | <10 | | 16 |

Table IV shows that ruthenium catalysts are effective over the entire range of composition shown, i.e. 5% to 50% ruthenium.

Example 5

The effect of pretreatment of ruthenium catalysts with hydrogen at elevated temperature is shown in Table V. The catalyst consisting of 6% ruthenium on activated alumina was activated in flowing hydrogen at 220° C. for four hours, 390° C. for two hours, and then 470, 550 and 595° C. for two hours each. Each activation treatment was followed by an evaluation. Results of the tests show catalyst activity increases with each successive activation, but that the increase became smaller as the activation temperature of 600° C. was approached.

TABLE V.—EFFECTS OF EXTENDED CATALYST ACTIVATION TREATMENT

| Test No. | Catalyst | Temperature Treatment in Flowing Hydrogen | Gm. Catalyst/ Gm. H₂/Second for conversion of— | | |
|---|---|---|---|---|---|
| | | | 30% | 50% | 70% |
| 44 | 6% Ru on Alumina (M-1) | None | | | |
| 45 | do | 4 hrs. at 220° C | 120 | 270 | 710 |
| 46 | do | 2 hrs. at 390° C | 17 | 41 | 100 |
| 47 | do | 2 hrs. at 470° C | 12 | 26 | 62 |
| 48 | do | 2 hrs. at 550° C | | 18 | 55 |
| 49 | do | 2 hrs. at 595° C | | | 50 |
| 50 | 50% Ru on Carbon | 2 hrs. at 200° C | 52 | 117 | 230 |

In another test, a 50% ruthenium on carbon catalyst was activated at 200° C. for two hours in flowing hydrogen and showed fair activity. When activated at 550° C. for two hours in flowing hydrogen, the catalyst became deactivated, indicating that excessive temperature may have caused sintering.

Example 6

The purpose of this example is to show:
(1) the relationship between Ru area, crystallite size and activity (Ru area determined using different techniques)
(2) the close correlation of the methods of determining ruthenium area.

It has been found that the ruthenium surface area has a marked relationship to the activity of the ruthenium catalyst. Table VI shows the relationship of ruthenium area of ruthenium on carbon catalyst vs. the activity. Tests 61 and 62 show the same relationship employing ruthenium on alumina catalyst.

As shown in Table VI, the ruthenium surface area is closely related to the crystallite size and amount of metal on the support. The metal surface area available in a supported catalyst of a given crystallite size would vary with the support and concentration of metal on the support.

The data show that the activity of the catalysts is closely related to the final crystallite size. 25% and 50% Ru/C catalysts having a final crystallite size of <100 A.

are clearly superior to those having a larger crystallite size.

TABLE VI

| Test No. | Composition, Percent Ru on Carbon | Total Surface Area, m.²/g. (B.E.T.) | Crystallite Dia.[1] A. | | Ruthenium Area, m.²/gram Catalyst | Gm. Catalyst/Gm. H₂/second for conversion of— | | |
|---|---|---|---|---|---|---|---|---|
| | | | Initial | Final | | 30% | 50% | 70% |
| 51 | 3.5 | | | 106 | 2 | | | >2,000 |
| 52 | 25 | 597 | 257 | 204 | 6 | 118 | 238 | 390 |
| 53 | 50 | 609 | 102 | 104 | 24 | 14 | 39 | 80 |
| 54 | 50 | 348 | [2]22 | 113 | 22 | 25 | 63 | 143 |
| 55 | 50 | 387 | 57 | 74 | 33 | 16 | 31 | 66 |
| 56 | 50 | 378 | 73 | 66 | 37 | 14 | 28 | 59 |
| 57 | 5 | 704 | [3] N.D. | [2]6 | 41 | 20 | 34 | 65 |
| 58 | 5 | 1,230 | N.D. | [2]5 | 49 | | 11 | 50 |
| 59 | 50 | 389 | 60 | 53 | 47 | 15 | 25 | 40 |
| 60 | 25 | 532 | N.D. | [2]14 | 86 | 8 | 14 | 27 |
| 61 | ([4]) | 121 | 16 | <10 | <25 | | | 50 |
| 62 | ([4]) | 121 | 165 | | <2 | 185 | 378 | 688 |

[1] Determined by X-ray as average crystallite size.
[2] Detremined by chemisorption.
[3] Not detected by X-ray.
[4] Ru (6%)/Al₂O₃.

What is claimed is:
1. A process for the conversion of hydrogen feed containing ortho-para hydrogen distribution which differs from the equilibrium ortho-para hydrogen distribution at any particular temperature to hydrogen having ortho-para content more closely approaching the equilibrium distribution thereof which comprises contacting at a temperature between about $-73°$ C. and $-250°$ C., said feed with a catalyst selected from the group consisting of metallic ruthenium and rhodium, cobalt, rhenium, tantalum and osmium binary alloys of ruthenium containing from 2 to 90% alloying metal, said catalyst having a surface area from 2 to 200 square meters per gram, and recovering hydrogen having a greater concentration of one form of hydrogen than was present in the feed.

2. The process of claim 1 wherein the catalyst is activated by treatment with hydrogen at a temperature between about 200° C. and 600° C. for at least one hour.

3. The process of claim 1 wherein the catalyst is distributed upon an inert support having a surface area between 2 and 1500 square meters per gram, said supported catalyst containing from about 5% to about 60% by weight of catalytic metal.

4. The process of claim 3 wherein the support is alumina.

5. The process of claim 3 wherein the support is carbon.

6. The process of claim 3 wherein the crystallite size of the supported metal, as measured by X-ray diffraction, is less than about 100 A.

7. A process for the conversion of hydrogen feed containing ortho-para hydrogen distribution which differs from the equilibrium ortho-para hydrogen distribution at any particular temperature to hydrogen having ortho-para content more closely approaching the equilibrium distribution thereof at such temperature which process comprises contacting said hydrogen feed with a supported ruthenium catalyst at a temperature between about $-73°$ C. and $-250°$ C., said catalyst having a ruthenium surface area of at least about 15 square meters per gram and containing from about 5% to about 60% by weight ruthenium, and said contacting being effected at a weight hourly space velocity between about 5 and about 500, and recovering hydrogen having a greater concentration of one form of hydrogen than was present in the feed.

References Cited

UNITED STATES PATENTS

| | | | |
|---|---|---|---|
| 2,943,917 | 7/1960 | Weitzel et al. | 23—210 |
| 3,116,115 | 12/1963 | Kasparion et al. | 23—212 X |
| 3,132,000 | 5/1964 | Dwyer et al. | 23—210 |
| 3,189,563 | 6/1965 | Hauel | 252—461 X |

OTHER REFERENCES

Chem. Abstracts, Volume 53, April 10, 1959, pages 5843 and 5844.

MILTON WEISSMAN, *Primary Examiner.*

EDWARD STERN, *Examiner.*